United States Patent
Mace et al.

(10) Patent No.: US 10,782,977 B2
(45) Date of Patent: Sep. 22, 2020

(54) FAULT DETECTING AND FAULT TOLERANT MULTI-THREADED PROCESSORS

(71) Applicant: MIPS Tech, LLC, Santa Clara, CA (US)

(72) Inventors: Timothy Charles Mace, Hemel Hempstead (GB); Ryan C Kinter, Seattle, WA (US)

(73) Assignee: MIPS Tech, LLC, Santa Clara, CA (US)

( * ) Notice: Subject to any disclaimer, the term of this patent is extended or adjusted under 35 U.S.C. 154(b) by 118 days.

(21) Appl. No.: 16/100,706

(22) Filed: Aug. 10, 2018

(65) Prior Publication Data

US 2019/0073225 A1    Mar. 7, 2019

(30) Foreign Application Priority Data

Aug. 10, 2017    (GB) .................................. 1712880.2

(51) Int. Cl.
*G06F 9/38* (2018.01)
*G06F 9/30* (2018.01)
(Continued)

(52) U.S. Cl.
CPC ........ *G06F 9/3861* (2013.01); *G06F 9/30145* (2013.01); *G06F 9/3814* (2013.01);
(Continued)

(58) Field of Classification Search
None
See application file for complete search history.

(56) References Cited

U.S. PATENT DOCUMENTS 5,682,495 A    10/1997   Beavers et al.
6,427,192 B1    7/2002   Roberts
(Continued)

FOREIGN PATENT DOCUMENTS

JP    2002342163 A    11/2002
WO    2010111636 A1    9/2010

OTHER PUBLICATIONS

Albonesi, D. H. (Nov. 1999). Selective cache ways: On-demand cache resource allocation. In Proceedings of the 32nd annual ACM/IEEE international symposium on Microarchitecture (pp. 248-259). IEEE Computer Society.
(Continued)

*Primary Examiner* — Michael Sun
(74) *Attorney, Agent, or Firm* — Adams Intellex, PLC

(57) ABSTRACT

Fault tolerant and fault detecting multi-threaded processors are described. Instructions from a program are executed by both a master thread and a slave thread and execution of the master thread is prioritized. If the master thread stalls or reaches a memory write after having executed a sequence of instructions, the slave thread executes a corresponding sequence of instructions, where at least the first and last instructions in the sequence are the same as the sequence executed by the master thread. When the slave thread reaches the point at which execution of the master thread stopped, the contents of register banks for both the threads are compared, and if they are the same, execution by the master thread is allowed to continue, and any buffered speculative writes are committed to the memory system.

25 Claims, 12 Drawing Sheets

(51) Int. Cl.
*G06F 9/52* (2006.01)
*G06F 11/07* (2006.01)
*G06F 9/48* (2006.01)

(52) U.S. Cl.
CPC .............. *G06F 9/3822* (2013.01); *G06F 9/52* (2013.01); *G06F 11/0754* (2013.01); *G06F 9/4881* (2013.01)

(56) References Cited

U.S. PATENT DOCUMENTS

| | | | |
|---|---|---|---|
| 6,567,839 B1* | 5/2003 | Borkenhagen | G06F 9/3009 712/205 |
| 6,944,714 B2 | 9/2005 | Lesarte et al. | |
| 7,424,599 B2* | 9/2008 | Kissell | G06F 8/4442 712/228 |
| 7,512,724 B1 | 3/2009 | Dennis et al. | |
| 8,793,689 B2* | 7/2014 | Hinton | G06F 9/52 712/220 |
| 9,858,116 B2* | 1/2018 | Cho | G06F 9/466 |
| 2001/0037448 A1* | 11/2001 | Mukherjee | G06F 9/383 712/244 |
| 2002/0023202 A1* | 2/2002 | Mukherjee | G06F 9/383 712/225 |
| 2003/0014597 A1 | 1/2003 | van de Waerdt | |
| 2004/0215882 A1 | 10/2004 | Alexander et al. | |
| 2004/0255185 A1 | 12/2004 | Fujiyama et al. | |
| 2005/0050304 A1* | 3/2005 | Mukherjee | G06F 9/3851 712/218 |
| 2005/0160228 A1 | 7/2005 | Teruyama | |
| 2005/0198476 A1 | 9/2005 | Gazsi et al. | |
| 2005/0223172 A1 | 10/2005 | Bortfeld | |
| 2007/0288776 A1 | 12/2007 | DeMent et al. | |
| 2009/0282220 A1 | 11/2009 | Norden | |
| 2010/0169628 A1* | 7/2010 | Hinton | G06F 9/3891 712/244 |
| 2011/0153926 A1 | 6/2011 | Fang et al. | |
| 2011/0296112 A1 | 12/2011 | Li et al. | |
| 2012/0239908 A1 | 9/2012 | Chen et al. | |
| 2012/0303897 A1 | 11/2012 | Pullagondapatti et al. | |
| 2013/0086368 A1* | 4/2013 | Gschwind | G06F 9/30167 712/226 |
| 2013/0304991 A1 | 11/2013 | Bottcher et al. | |
| 2014/0372731 A1 | 12/2014 | Nystad et al. | |
| 2015/0347297 A1 | 12/2015 | Hagersten et al. | |
| 2016/0019158 A1 | 1/2016 | Palacharla et al. | |
| 2016/0321078 A1 | 11/2016 | Bailey | |
| 2016/0328320 A1 | 11/2016 | Dooley et al. | |

OTHER PUBLICATIONS

Settle, A., Connors, D., Gibed, E., & González, A. (2006). A dynamically reconfigurable cache for multithreaded processors. Journal of Embedded Computing, 2(2), 221-233.

Chiou, D., Jain, P., Rudolph, L., & Devadas, S. (Jun. 2000). Application-specific memory management for embedded systems using software-controlled caches. In Proceedings of the 37th Annual Design Automation Conference (pp. 416-419). ACM.

* cited by examiner

FAULT DETECTING AND FAULT TOLERANT MULTI-THREADED PROCESSORS

RELATED APPLICATIONS

This application claims the benefit of G.B. patent application "Fault Detecting and Fault Tolerant Multi-Threaded Processors" App. No. 1712880.2, filed Aug. 10, 2017.

The foregoing application is hereby incorporated by reference in its entirety.

FIELD OF ART

This application relates generally to multi-threaded processors and more particularly to fault detecting and fault tolerant multi-threaded processors.

BACKGROUND

Fault tolerant systems are systems which are designed to continue working even in the presence of some errors. Such systems may therefore involve redundancy and the use of error checking mechanisms. In contrast, fault detecting systems can identify faults but cannot necessarily continue working without use of a separate recovery system. In both real-time fault tolerant systems and real-time fault detecting systems, it is important to quickly identify and resolve errors in calculations (where possible) as the errors can have serious consequences. Real-time fault tolerant systems may, for example, be used in systems where safety is critical (e.g. control systems for cars, planes, spacecraft or nuclear power plants, signaling systems for railways, etc.) or where maintenance is infrequent (e.g. for space applications such as on satellites).

The embodiments described below are not limited to implementations which solve any or all of the disadvantages of known fault tolerant or fault detecting processors.

SUMMARY

This Summary is provided to introduce a selection of concepts in a simplified form that are further described below in the Detailed Description. This Summary is not intended to identify key features or essential features of the claimed subject matter, nor is it intended to limit the scope of the claimed subject matter.

Fault tolerant and fault detecting multi-threaded processors are described. Instructions from a program are executed by both a master thread and a slave thread and execution of the master thread is prioritized. If the master thread stalls or reaches a memory write having executed a sequence of instructions, the slave thread executes a corresponding sequence of instructions (where at least the first and last instructions in the sequence are the same as the sequence executed by the master thread). When the slave thread reaches the point at which execution of the master thread stopped, the contents of register banks for both threads are compared and if they are the same, execution by the master thread is allowed to continue and any buffered speculative writes are committed to the memory system.

A method of operating a multi-threaded processor is disclosed comprising: fetching a plurality of instructions from a program by a first thread starting at a first program counter, the first thread using a first register bank; fetching a plurality of instructions from the program by a second thread starting at the first program counter, the second thread using a second register bank in response to the first thread stalling at a point in the program or reaching a predefined synchronization point in the program; comparing contents of the first and second register banks in response to the second thread reaching the point in the program where the first thread stalled or reached the predefined synchronization point; and triggering a further plurality of instructions from the program by one of the first and second threads followed by a further plurality of instructions by the other of the first and second threads in response to determining that the contents match.

In embodiments, the predefined synchronization point is a memory write. In embodiments, the predefined synchronization point is a cache miss. Some embodiments further comprise allowing the memory write to complete before triggering a further plurality of instructions from the program by one of the first and second threads followed by a further plurality of instructions by the other of the first and second threads in response to determining that the contents match. Other embodiments further comprise comparing write data and write addresses of memory writes of the first and second threads. In still other embodiments, the triggering a further plurality of instructions from the program by one of the first and second threads followed by a further plurality of instructions by the other of the first and second threads in response to determining that the contents match only occurs when the comparing write data and write addresses of memory writes of the first and second threads produces a match.

Embodiments include a multi-threaded processing apparatus comprising: a first register bank associated with a first thread; a second register bank associated with a second thread; and a multi-stage execution pipeline comprising: a scheduler implemented in hardware logic and arranged to cause a plurality of instructions from a program to be fetched by the first thread starting at a first program counter value and to cause a plurality of instructions from the same program to be fetched by the second thread starting at the first program counter in response to the first thread stalling or reaching a predefined synchronization point in the program; and comparison logic arranged to compare contents of the first and second register banks in response to determining that the second thread has caught up with the first thread, wherein in response to determining that the contents match, to trigger fetching of a next plurality of instructions from the program by one of the first and second threads followed by the other of the first and second threads.

The multi-threaded processing apparatus may be embodied in hardware on an integrated circuit. There may be provided a method of manufacturing, at an integrated circuit manufacturing system, a multi-threaded processing apparatus. There may be provided an integrated circuit definition dataset that, when processed in an integrated circuit manufacturing system, configures the system to manufacture a multi-threaded processing apparatus. There may be provided a non-transitory computer readable storage medium having stored thereon a computer readable description of an integrated circuit that, when processed in an integrated circuit manufacturing system, causes the integrated circuit manufacturing system to manufacture an integrated circuit embodying a multi-threaded processing apparatus. The multi-threaded processing apparatus may be known as a processor, a processor chip, a processor module, and so on.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
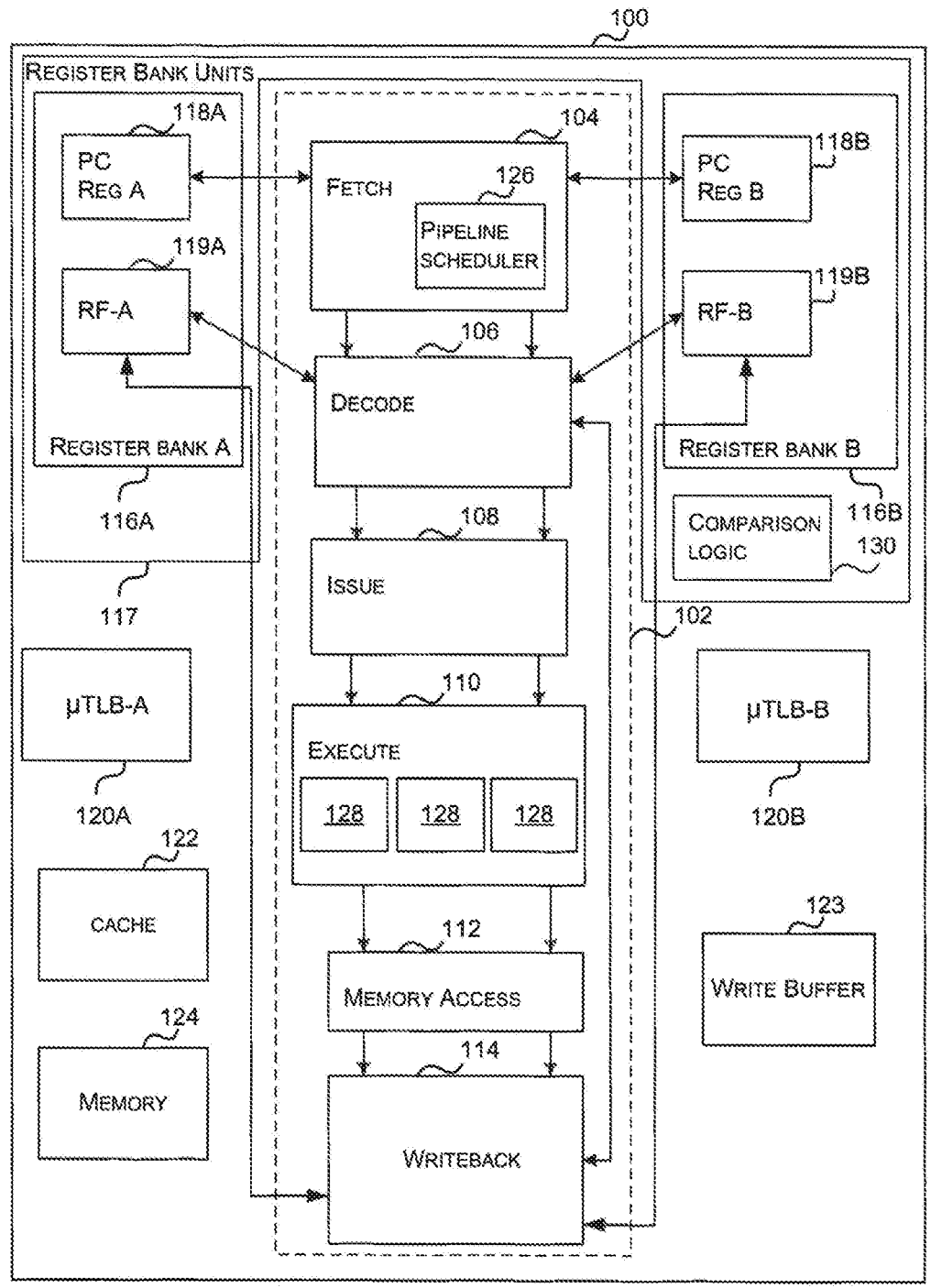
FIG. 1 shows a schematic diagram of an example fault detecting multi-threaded in-order processor.

The following description is presented by way of example to enable a person skilled in the art to make and use the invention. The present invention is not limited to the embodiments described herein and various modifications to the disclosed embodiments will be apparent to those skilled in the art. Embodiments will now be described by way of example only.

Fault tolerant processors must continue to operate even in the presence of a number of errors. Techniques used in existing fault tolerant processors involve using multiple processor cores to execute the same code, with results being compared at the end of each operation. If the results are not identical then the comparison signals an error. Alternatively, where there are more than two cores, a voting system may be used to decide which result is correct (i.e. with the result obtained by the majority of cores being taken as the correct result). In contrast to fault tolerant processors, fault detecting processors can identify and flag when an error occurs, but cannot recover from it without use of a separate error recovery system.

Alternative designs of both fault detecting processors and fault tolerant processors are described herein which use multi-threading within a single processor core and use the temporal and/or spatial separation of instructions running in two different threads in a multi-threaded processor pipeline. This results in a reduction in both the size (or area) of the processor and the power consumption of the processor compared to the use of multiple cores. The fault detecting and fault tolerant processors as described below may therefore be particularly suited to applications where space and/or power are constrained (e.g. battery-powered portable computing devices, wearable devices, etc.); however, they may also be used in other applications. Of the two threads which execute the same instructions, one is considered the master and the other the slave; execution of the master thread is prioritized. When the master thread stalls or reaches a predefined synchronization point within the instructions (which may, for example, be a memory write), the master thread waits for the slave thread to catch up. When the slave thread reaches the same position within the code as the master thread, the register state (and optionally any write address and write data in the event of a memory write) for the two threads are compared and if they match, the master thread can continue (e.g. by performing the memory write). In the fault detecting processors described herein, if the register state (and any read I write address and/or write data) for the master and slave threads does not match, the operation is halted and an error is flagged. In contrast, in the fault tolerant processors described herein, if the register state (and any read I write address and/or write data) for the master and slave threads do not match, the code sequence from the previous point of comparison (e.g. the previous synchronization point) is rerun. The methods described herein are implemented in hardware and are transparent to the software that is executed by the processor.

FIG. 1 shows a schematic diagram of an example fault detecting multi-threaded in-order processor 100. In this example the multi-threaded processor 100 is a two-threaded processor (with the threads denoted thread A and thread B); however, the methods are also applicable to multi-threaded processors with different numbers of threads (e.g. four or more threads).

The multi-threaded processor 100 comprises multi-stage pipeline 102 comprising a fetch stage 104, a decode stage 106, an issue stage 108, an execute stage 110, a memory access stage 112 (although this may be omitted in some processors), and a writeback stage 114. The pipeline 102 is shared between the threads, but some elements (which may also be referred to as resources) are provided separately (i.e. are duplicated) for each thread. For example, each thread has a dedicated register bank 116A, 116B which includes registers 118A, 118B for storing the program counter for the particular thread and one or more register files (RFs) 119A, 119B. The register banks 116A, 116B may be logically considered to be part of a register bank unit 117 and although the two register banks 116A, 116B are shown separately in FIG. 1, they may comprise a single bank of registers with the location that is read from or written to as determined by the register name in the instruction and the thread that is executing.

In some examples, only the register banks are duplicated (i.e. provided separately for each thread); however, in other examples, one or more other elements may also be duplicated. In the example shown in FIG. 1, each thread also has a separate micro translation lookaside buffer (μTLB) 120A, 120B and this makes the implementation less complex compared to use of a shared μTLB and also improves performance in some circumstances; however, in other examples there may be a shared μTLB or separate I shared instruction and data TLBs. There are also some elements (or resources) which are shared between threads, such as the cache 122, write buffer 123 and memory 124. By minimizing the duplication of elements for the individual threads, the size and power requirements of the processor are minimized.

The two threads run through the pipeline 102 (and may run concurrently through the pipeline 102) and at any point in time, each stage in the pipeline (e.g. the fetch stage 104, decode stage 106, issue stage 108, execute stage 110, memory access stage 112 and writeback stage 114) is either idle or executing a single thread (e.g. either thread A or thread B). Thread A uses its dedicated resources (e.g. register bank A 116A, μTLB-A 120A) and some of the shared resources (e.g. some stages in the shared pipeline and parts of the cache 122) while thread B uses its dedicated resources (e.g. register bank B 116B, μTLB-B 120B) and other non-overlapping shared resources (e.g. other stages in the shared pipeline and other parts of the cache 122).

The fetch stage 104 is configured to fetch instructions from a program (in program order) as indicated by a program counter (PC). The program may be stored in memory 124 which may be part of a memory hierarchy including the cache 122 to reduce the latency of accessing the memory 124. A scheduler 126 (which may be referred to as a 'pipeline scheduler') within the fetch stage 104 controls the order in which instructions are fetched and by which thread.

The decode stage 106 is arranged to interpret the instructions which have been fetched by the fetch stage 104.

The issue stage 108 selects a thread to be executed during each cycle and hence controls the order in which instructions are passed along the pipeline to the execution stage 110. The issue stage 108 may therefore be described as comprising a second scheduler (with the first scheduler being scheduler 126 in the fetch stage 104). In some processors this issue stage 108 may be omitted (and in various examples it may be replaced by a shared instruction buffer) such that the instructions proceed through the processor pipeline in the order in which they were fetched, and hence the scheduler 126 implicitly controls the order in which instructions are executed.

The execution stage 110 comprises one or more functional (or execution) units 128. Each functional unit 128 is responsible for executing instructions and a functional unit may be configured to execute specific types of instructions. For example, one or more functional units 128 may be a load/store unit, an integer unit, a floating point unit (FPU), a digital signal processing (DSP)/single instruction multiple data (SIMD) unit, or a multiply accumulate (MAC) unit. A load/store unit performs load and store memory instructions, an integer unit performs integer instructions, an FPU executes floating point instructions, a DSP/SIMD unit has multiple processing elements that perform the same operation on multiple data points simultaneously, and a MAC unit computes the product of two numbers and adds that product to an accumulator. The functional units and the pipelines therein may have different lengths and/or complexities. For example, a FPU pipeline is typically longer than an integer execution pipeline because it is generally performing more complicated operations. The execution (in the execute stage 110) may involve reading from one or more register files (RFs) and in the example shown in FIG. 1, separate register files 119A, 119B are provided for each of the threads.

The memory access stage 112 (where implemented) is arranged to perform any data memory accesses.

The writeback stage 114 (which may also be referred to as the commit stage or the graduation unit) commits the results of the instruction to the register/memory (e.g. to register files 119A, 119B, cache 122 or memory 124) and/or writes the results to an output (e.g. to an output device).

The processor additionally comprises comparison hardware logic 130 and this may be located within the register bank unit 117 (as shown in FIG. 1) or elsewhere (e.g. in the writeback stage 114). The operation of this comparison hardware logic 130 is described below.

The multi-threaded processor 100 may also comprise functional elements other than those shown in FIG. 1. It will be appreciated that other processors may not comprise all the functional elements shown in FIG. 1 (i.e. one or more of the functional elements shown in FIG. 1 may be omitted).

Figure 2:
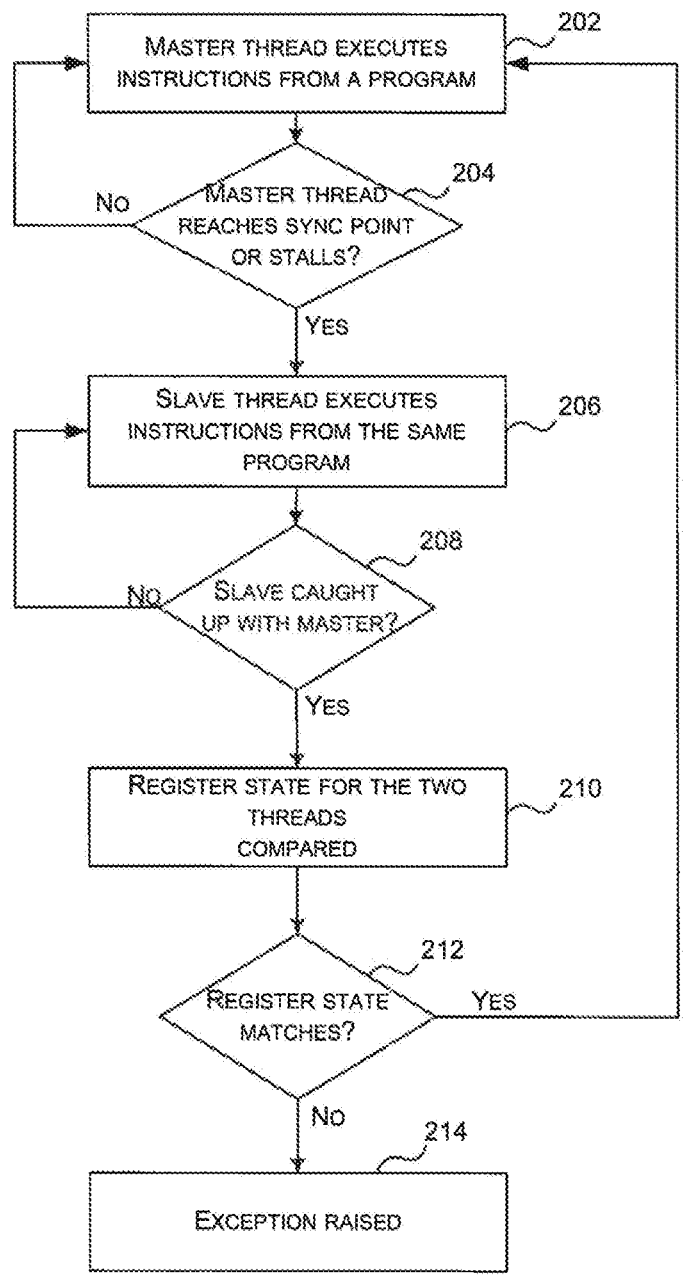
FIG. 2 is a flow diagram showing an example method operation of a multi-threaded fault detecting processor.

FIG. 2 is a flow diagram showing an example method operation of a multi-threaded fault detecting processor, such as the processor 100 shown in FIG. 1. As shown in FIG. 2, two threads (e.g. threads A and B) execute the same program, but one of the threads, denoted the master, is prioritized. Initially the master thread executes instructions from the program (block 202). When the master thread reaches a predefined synchronization point or stalls ('Yes' in block 204), e.g. as a consequence of a memory read, execution of the program by the master thread stops and the slave thread executes instructions from the program starting at the same point in the program (e.g. at the same PC) at which the master thread started (block 206). In this way, the slave thread executes (in block 206) the same instructions from the program that have previously been executed by the master thread (in block 202), but at a later point in time. This means that a transient event that forces a signal to an incorrect state (and hence causes one or more register bits to be inverted) will affect the operation of the two threads in different ways (i.e. as they are not executing the same instruction from the same program at the same time). In embodiments, the predefined synchronization point can include the master thread indicating completion of instruction(s), an interval of elapsed cycle time passing, a technology-dependent time period in which an alpha-particle or cosmic ray upset event is likely to have completed, and so on.

When the slave thread catches up with the master thread ('Yes' in block 208), the register state for the two threads (and optionally write data and a write address, e.g. where the synchronization point is a memory write) is compared (block 210). If the register state for the two threads is the same ('Yes' in block 212), then execution of the program by the master thread continues (as indicated in FIG. 2 by the arrow from block 212 to block 202). If the register state is, however, not the same ('No' in block 212), then an exception, e.g. an error notification or flag, is raised (block 214).

To determine whether the slave thread has caught up with the master thread (in block 208), the two PCs may be compared in order to determine whether the PCs match, in which case the slave may be considered to have caught up with the master thread. However, in various examples, the matching of the two PCs may require one of a number of tests that must be passed in order for the slave thread to be considered to have caught up with the master thread. For example, where a loop repeats the same sequence of code, two threads may have the same PC but may be in different iterations of the loop and in such circumstances, comparing the PCs to determine if they match is insufficient.

In various examples, two instruction counters may be used. A first instruction counter may count the number of instructions executed by the master thread (in block 202) and a second instruction counter may count the number of instructions executed by the slave thread (in block 206). The slave thread may be considered to have caught up with the master thread (in block 208) if both the PCs and the value of the two instruction counters match. The value of both instruction counters may be reset following a successful comparison of register state (e.g. following 'Yes' in block 212).

In examples where speculative execution (e.g. branch prediction) is used, the number of instructions executed by the master and slave threads may not be the same at the point when the slave thread catches up with the master thread, e.g. where one of the threads performs some incorrect branch prediction such that the speculative instructions which have been executed are discarded. To address this, a third instruction counter may be used to count speculative instructions; two different ways of using this third counter are described. In a first example, the third counter may count speculative instructions in parallel to the instruction counter for the executing thread. If branch prediction is subsequently found to be incorrect, the speculative instruction count (i.e. the value of the third counter) is subtracted from the value of the instruction counter for the executing thread. Alternatively, speculative instructions may be counted separately using the third counter, without also incrementing the instruction counter for the executing thread and once the branch prediction is verified, the speculative instruction count (i.e. the value of the third counter) is added to the value of the instruction counter for the executing thread. Some embodiments include subtracting a value of the third instruction counter from the first instruction counter if the first thread is the executing thread or from the second instruction counter if the second thread is the executing thread, based on incorrect branch prediction.

Where the master stops executing because it has reached a memory write (which in various implementations may be synonymous with a synchronization point), the memory write of the master thread is buffered (in block 204, e.g. using write buffer 123) and the write is only permitted to complete operation following a successful comparison of register state ('Yes' in block 212) once the slave thread has also reached the memory write. In various examples, the write address and data to be written to that address may be compared in addition to the register state (in block 210). In other examples, however, as the write address and data to be written are both likely to be stored in register state, performing such an additional comparison may be omitted.

By comparing the entire register state, errors may be detected earlier and/or more errors may be detected compared to systems in which only the write address and write data are compared. In a system in which only the write address and data are compared, an error may not be detected when it has affected the register state, and when that state did not affect the write address or write data. Such errors in register state are likely to affect the future output of the program, but the error will take much longer to detect, making it more difficult and less efficient to recover from the error.

In various examples, synchronization may not be performed at each write, but instead the processor 100 may be allowed to perform multiple writes before synchronization and instead the synchronization may be aligned to a cache miss generating a period of stalled operation. This does not impact performance (in terms of speed) of the processor, compared to a non-fault detecting processor, as the duplicate operation of the slave thread is confined to periods when the master thread is stalled; however, the buffer that stores the writes between synchronization points is complex. To prevent corruption of the cache and hence the main memory, the write buffer 123 may, for example, be configured such that it can store a number of cache lines. Each entry in the write buffer 123 has three states: unused, written by master, and written by both threads. If the master thread executes a write, it is stored in the buffer 123 and the state of the entry into which it is written moves to 'written by master' from 'unused'. If the master thread subsequently reads from that location, it will take the value from the buffer, not from the cache or memory system.

If the slave writes a value, it is compared to the value written by the master. If equal, that buffer location moves to state 'written by both threads'. If not, an error has occurred and this is handled by flagging (in block 214). If the slave thread reads from a location that is also stored in this write buffer, it reads the value from the buffer if the state is 'written by both threads' otherwise it reads the value from the cache.

Once the threads synchronize (following 'Yes' in block 212), the buffer contents are used to update the corresponding cache locations and are cleared by setting the state to 'unused'.

Although as shown in the method of FIG. 2, the execution of the master thread is always prioritized, this does not necessarily result in the same thread (e.g. thread A or thread B in FIG. 1) always being prioritized. When the execution continues after a successful comparison of the register state (in blocks 210-212), the roles of the master and slave may be swapped between the two threads which are executing the same instructions from a program.

By always prioritizing the master thread over the slave thread, the temporal separation of the execution of two identical instructions by the two threads is maximized (i.e. the temporal separation between the master thread executing a particular instruction and the slave thread executing the same instruction), while still ensuring that errors are detected before they affect the output of the program. By increasing the temporal separation, the possibility that an error will affect both threads in the same way is reduced.

In various examples, a minimum separation between the threads (e.g. ten clock cycles) may be enforced. This may, for example, be implemented using instruction counters (some of which may be the same as the instruction counters described above). In such an example, the master thread has an instruction counter that is reset to zero at each synchronization point and a minimum time separation of S clocks is predefined between the master and slave threads (where S is a natural number, e.g. S=10). Another counter, referred to as the slave thread limit counter, tracks the master thread counter but is delayed by S clock cycles, such that the value of the slave thread limit counter at any time corresponds to the value of the master thread instruction counter at a time S clock cycles before the current time. The slave thread also has an instruction counter and can execute instructions (in block 306) if its instruction counter is less than the slave thread limit counter. Thus some embodiments include enforcing a minimum time separation of S clock cycles between the first and second thread executing a same instruction from the same program, wherein S is a predefined, positive integer.

Furthermore, the prioritization of the master thread improves performance because less than half of processing time (typically only between a quarter and third of processing time) is spent executing instructions and the remainder of the time is spent on memory reads and writes. Using the method of FIG. 2, the duplicate execution by the slave thread occurs when the master thread stalls, e.g. due to waiting for the result of a previous instruction to be calculated, a memory read (e.g. as a consequence of a cache miss), a TLB miss, etc. By performing the duplicate execution by the slave thread in parallel with a memory read and as the slave thread is executing the same program as the master thread, the data which is to be read will be available when required by the slave thread (e.g. it will already be stored in the shared cache 122).

Using the method of FIG. 2, the entire register state of the master and slave threads (i.e. the entire contents of the two register banks) is always compared before a memory write which will affect the contents of the cache I memory, but may additionally be compared at other points in the program, e.g. at other predefined synchronization points and/or whenever the master thread stalls (e.g. upon memory reads).

In various examples, the method of FIG. 2 may be used with a multi-threaded processor which performs speculative execution such as branch prediction. In such a processor, the sequence of instructions which are executed by the master and slave thread to reach a point where a comparison is performed (in block 210) may not be identical; however the first and last instructions in the sequences performed by the master and slave threads will be the same (i.e. they both start at the same PC and the comparison is performed when the slave thread reaches the point in the program where execution of the master thread stopped). The differences in the actual sequence of instructions fetched may exist, for example, because the history data which is used when performing the branch prediction is updated based on the prediction made when executing the master thread and so a different (e.g. better) prediction may be made when executing the slave thread (as a consequence of the history data being different). Accordingly, using the methods described herein, there is no requirement that the two threads execute exactly the same sequence of instructions; however, the two threads will execute the same sequence of confirmed instructions (i.e. excluding those instructions which are incorrectly executed by either thread as a result of incorrect speculation).

Figure 3:
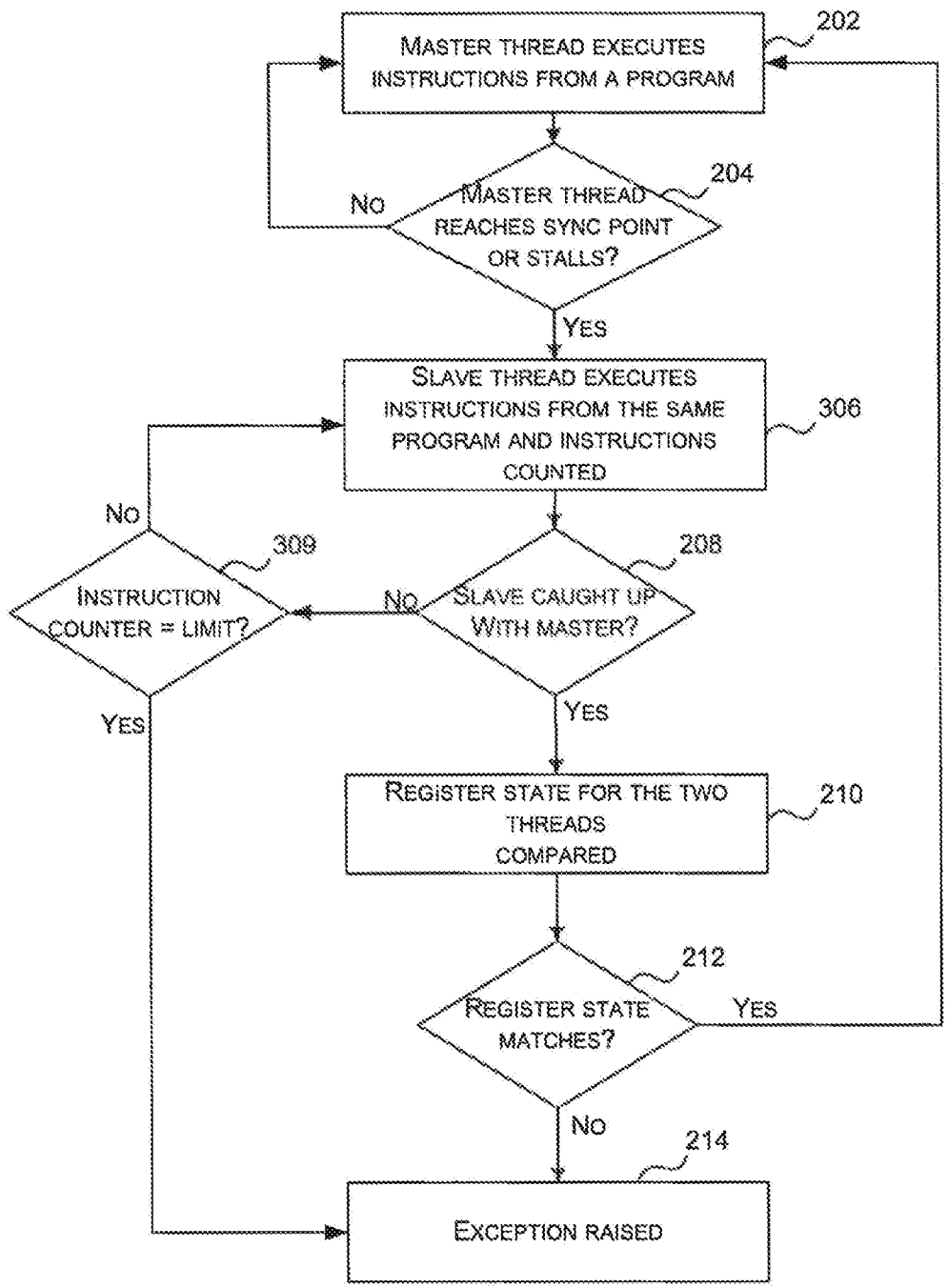
FIG. 3 is a flow diagram showing another example method operation of a multi-threaded fault detecting processor.

In various examples, where speculative execution is used, the method of FIG. 2 may be modified, as shown in FIG. 3, to include a counter which counts the number of instructions executed by the slave thread (block 306) after the master thread has stalled or reached a synchronization point (in block 204). In the event that the number of instructions executed by the slave thread (as counted in block 306) reaches a threshold value or limit ('Yes' in block 309), then an exception is raised (block 214). Depending upon the particular implementation, the counter may count up (e.g. from zero) with the limit being a non-zero value or the counter may count down toward zero and then reset the position in the program if zero is reached ('Yes' in block 309) before the PCs of the two threads match (in block 208). Use of such a counter enables recovery from a situation where a transient error results in the slave thread entering an infinite loop. In various examples, a further counter may be implemented to count the number of instructions executed by the master thread (in block 202), and in the event that this counter reaches a threshold value or limit, an exception can be raised. It will be appreciated that where the determination of whether the slave thread has caught up with the master thread (in block 208) uses a plurality of instruction counters (as described above), then these instruction counters may be compared to a threshold value or limit (e.g. in block 309).

Referring back to the processor 100 shown in FIG. 1, the pipeline scheduler 126 controls which thread is executing and implements the prioritization of the master thread. Consequently, the pipeline scheduler 126 controls the operation of the first part of the methods of both FIGS. 2 and 3. In particular, the pipeline scheduler 126 schedules the master thread to execute a sequence of instructions from a program until it reaches a synchronization point or the thread stalls and at that point the pipeline scheduler 126 schedules the slave thread to execute instructions from the same program. As detailed above, this may be the same sequence of instructions or a slightly different sequence of instructions as a consequence of differences in speculative execution, but both threads execute the same sequence of confirmed instructions. The comparison logic 130 performs the operations in the second part of the methods of both FIGS. 2 and 3. In particular, the comparison logic 130 compares the register state for the two threads (in block 210) and triggers either the continued execution (in response to the register state matching) or the raising of an exception (in response to the register state not matching). The triggering of the continued execution may, for example, involve the comparison logic 130 sending signals to the pipeline scheduler 126 to influence what instructions are fetched and by which thread. Where a counter is used (e.g. as shown in FIG. 3 and described above or in any of the other examples of counter use described above), this may be implemented within the pipeline scheduler 126 alone, e.g. such that the pipeline scheduler 126 determines whether the limit has been met (in block 309), or may be implemented within the comparison logic 130. Alternatively, a combination of the pipeline scheduler 126 and the comparison logic 130 may be used.

Figure 4:
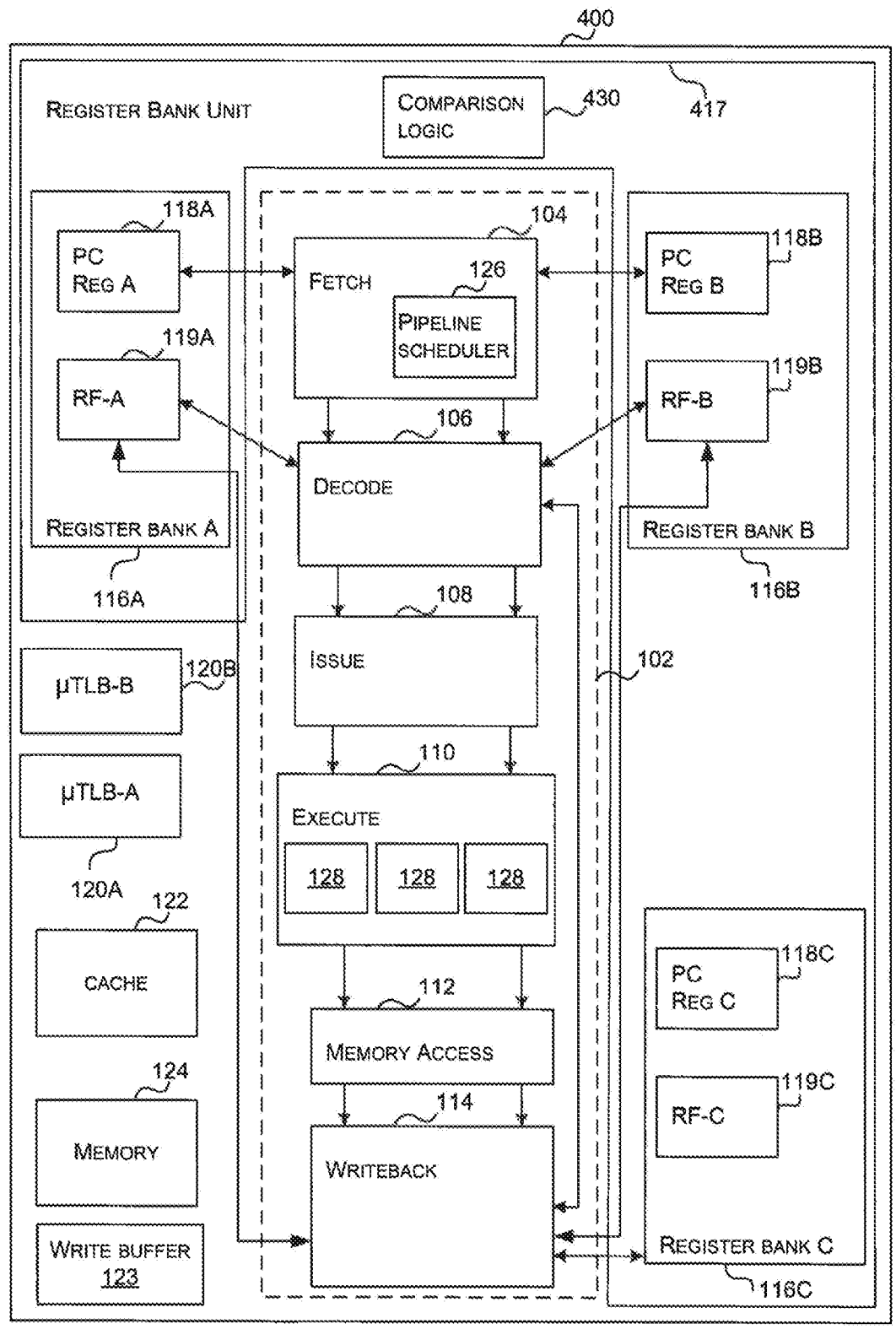
FIG. 4 shows a schematic diagram of an example fault tolerant multi-threaded in-order processor.

FIG. 4 shows a schematic diagram of an example fault tolerant multi-threaded in-order processor 400 which is a variant of the processor 100 shown in FIG. 1 and described above. Compared to the processor 100 shown in FIG. 1, the multi-threaded processor 400 shown in FIG. 4 includes a third thread, denoted thread C. This third thread comprises at least a register bank 116C (which comprises registers for storing the program counter 118C and a register file 119C) which is part of the register bank unit 417; however other elements which are duplicated for the first and second threads (threads A and B) may not be provided for the third thread (e.g. a 1JTLB is not provided for thread C in the example shown in FIG. 4). Unlike the processor 100 shown in FIG. 1, the provision of the third thread enables the processor to recover from a fault rather than to simply detect the error, and hence the processor is referred to as being fault tolerant rather than fault detecting.

Figure 5:
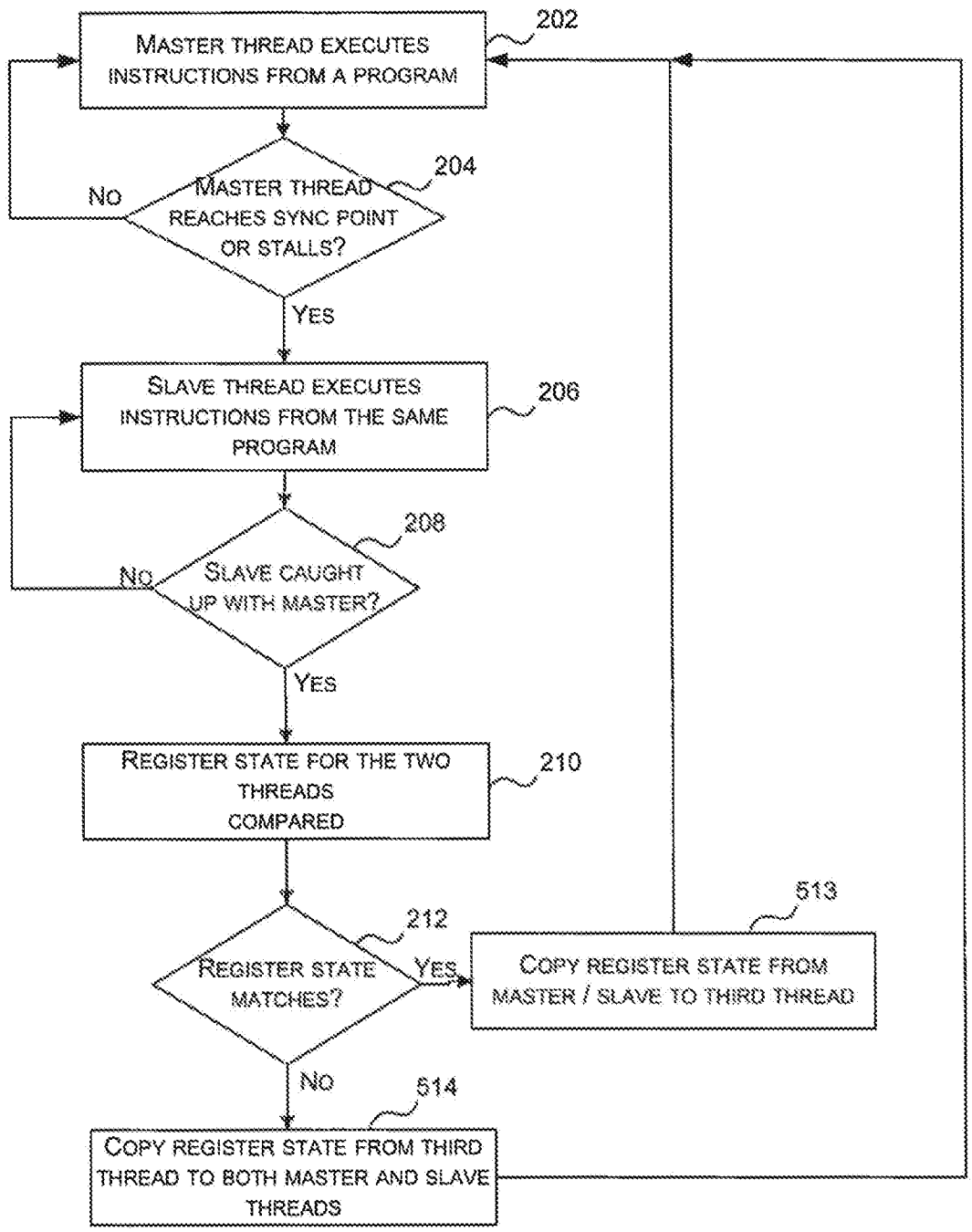
FIG. 5 is a flow diagram showing a further example method operation of a multi-threaded processor.
Figure 6:
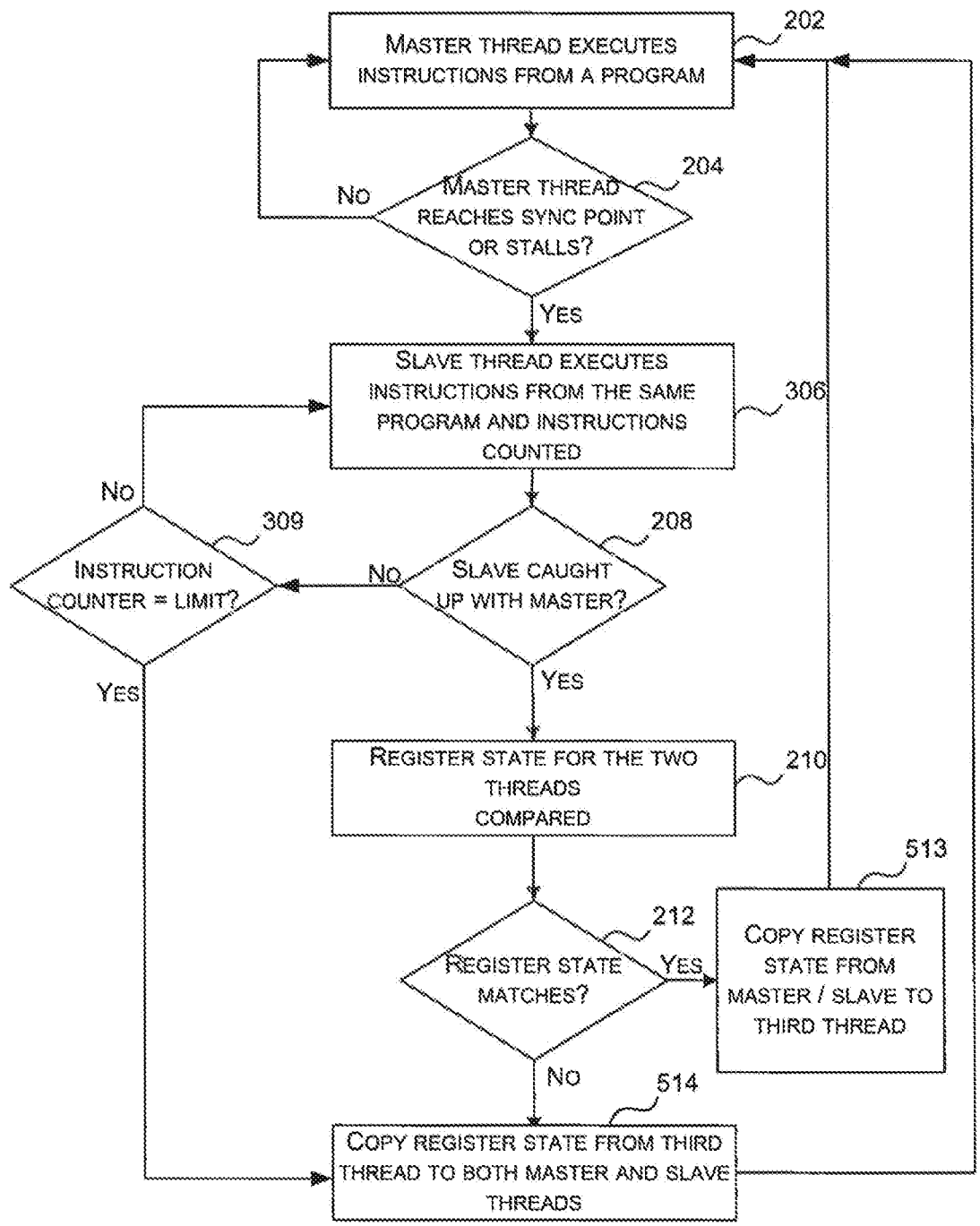
FIG. 6 is a flow diagram showing another example method operation of a multi-threaded processor.

As can be described with reference to FIGS. 5 and 6 (which are variations of FIGS. 2 and 3 respectively), the third thread is used to store a 'known good register state' and this is used to recover from a transient error. If, when the register state is compared (in block 210), the register state for the master thread matches the register state for the slave thread ('Yes' in block 212), then the state from either the slave or the master thread is copied to the third thread (block 513) before the execution of the program by the master thread continues (in block 202). This updates the known good register state in the third thread, including the value of the PC at the point that the known good state relates to (as stored in the PC registers 118C). In contrast, if when the register state is compared (in block 210), the register state for the master and slave threads does not match ('No' in block 212), then the known good state from the third thread is copied to the master and slave threads (block 514), i.e. the register state is copied from the register bank 116C of the third thread to the register banks 116A, 116B of the first and second threads. As the register state that is copied (in block 514) includes the PC at the point when the known good register state was created, the copying of the register state (in block 514) also resets the master and slave threads back to the last point where there was a successful comparison of register state and execution continues from that point by the master thread (as indicated in FIGS. 5 and 6 by the arrow from block 514 to block 202). As shown in FIG. 6, where a counter is used, in the event that the counter reaches its limit ('Yes' in block 309), the register state is also copied from the third thread to both the master and slave threads (in block 514) before the master continues to execute the program from the point of the last successful comparison of register state.

As described above with reference to FIGS. 1-3, in various examples multiple writes may be permitted before a synchronization point by storing the writes in a write buffer that can store a number of cache lines (as described above).

As described above with reference to FIGS. 2 and 3, in the methods of FIGS. 5 and 6, the entire register state of the master and slave threads (i.e. the contents of the register banks used by the particular threads) is always compared before a memory write which immediately affects the contents of the cache I memory (and additionally the write address and/or write data may be explicitly compared at this point), but the entire register state of the master and slave threads may additionally be compared at other points in the program, e.g. at other predefined synchronization points and/or whenever the master thread stalls (e.g. upon memory reads). In contrast, however, if only the write address and data were compared, some errors may not be detected (e.g. because while they affected register state, that state did not affect the write address or write data) and this would result in corruption of the known good register state and would also prevent later recovery once the error was detected (e.g. because the error affected the write data or write address of a subsequent memory write).

As described above with reference to FIGS. 2 and 3, the methods of FIGS. 5 and 6 may involve the use of one or more additional counters, e.g. to assist in determining when the slave thread has caught up with the master thread (in block 208), to implement a minimum time separation between the execution of the master thread and the execution of the same instruction by the slave thread, and/or to address a situation when one of the threads gets stuck in an infinite loop.

As described above with reference to FIGS. 2 and 3, the methods of FIGS. 5 and 6 may be used with speculative execution (e.g. branch prediction) and there is no requirement that the instructions are executed by the two threads in exactly the same sequence; however, the same sequence of confirmed instructions is executed.

Referring back to FIG. 4, the copying of the register state between threads (in blocks 513 and 514) may be implemented by the comparison logic 430 which may otherwise function in the same way as the comparison logic 130 shown in FIG. 1 and described above.

By using the third thread to store a known good register state (as described above with reference to FIGS. 4-6), the method (and hence the multi-threaded processor) can recover quickly and reliably from a transient error.

The processors 100, 400 described above which implement the methods of any of FIGS. 2, 3, 5 and 6 are in-order processors. The methods may, however, also be used in an out-of-order multi-threaded processor if additional constraints are placed on the reordering such that later instructions cannot overtake a memory write or other synchronization point, with the comparisons of register state being performed at predefined synchronization points, which include at least each memory write, in the program. Where the methods are used in an out-of-order multi-threaded processor, the position of synchronization points is more limited because these points must be predefined (e.g. synchronization cannot occur in the event of a cache read miss).

Figure 7:
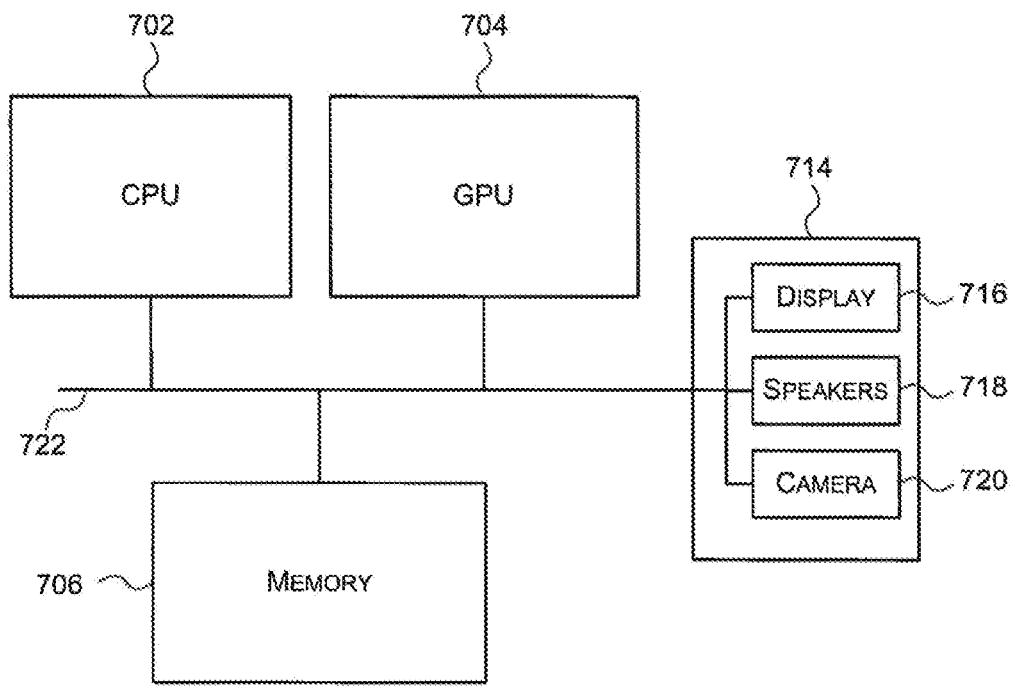
FIG. 7 shows a computer system in which a processor is implemented.

FIG. 7 shows a computer system in which the multi-threaded processor 100, 400 described herein may be implemented. The computer system comprises a CPU 702, a GPU 704, a memory 706, and other devices 714, such as a display 716, speakers 718, and a camera 720. The CPU 702 may correspond to the processor 100 shown in FIG. 1 or the processor 400 shown in FIG. 4, and may operate as shown in any of FIGS. 2, 3, 5 and 6. The components of the computer system can communicate with each other via a communications bus 722.

The processors of FIGS. 1 and 4 are shown as comprising a number of functional blocks. This is schematic only and is not intended to define a strict division among different logic elements of such entities. Each functional block may be provided in any suitable manner. It is to be understood that intermediate values described herein as being formed by a particular functional block need not be physically generated by the particular functional block at any point and may merely represent logical values which conveniently describe the processing performed by the functional block between its input and output.

The processors described herein may be embodied in hardware on an integrated circuit. The processors described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component," "element," "unit," "block," and "logic" may be used herein to generally represent software, firmware, hardware, or any combination thereof. In the case of a software implementation, the module, functionality, component, element, unit, block, or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java™ or OpenCL™. Executable code may be, for example, any kind of software, firmware, script, module or library which, when suitably executed, processed, interpreted, compiled, or executed at a virtual machine or other software environment, causes a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a processor configured to perform any of the methods described herein, or to manufacture a system on a chip comprising any apparatus described herein. An integrated circuit definition dataset may be, for example, an integrated circuit description.

Therefore, there may be provided a method of manufacturing, at an integrated circuit manufacturing system, a processor as described herein. Furthermore, there may be provided an integrated circuit definition dataset that, when processed in an integrated circuit manufacturing system, causes the method of manufacturing a processor to be performed.

An integrated circuit definition dataset may be in the form of computer code, for example as a netlist, code for configuring a programmable chip; as a hardware description language defining hardware suitable for manufacture in an integrated circuit at any level, including as register transfer level (RTL) code; as high-level circuit representations such as Verilog or VHDL; and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a processor as described above will now be described with respect to FIG. 8.

Figure 8:
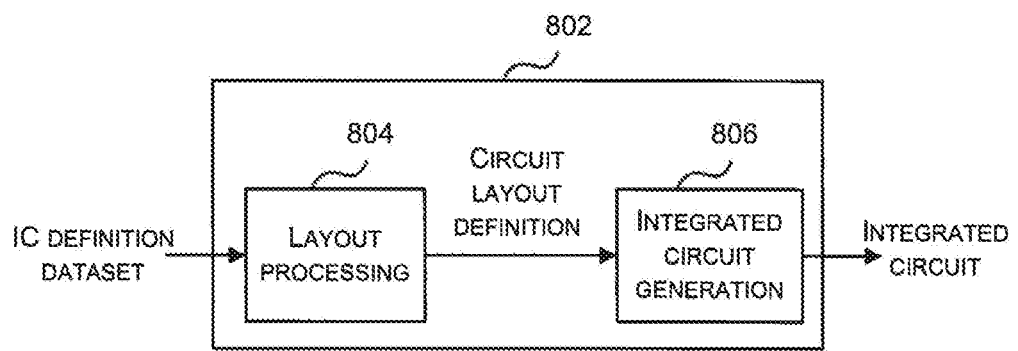
FIG. 8 shows an integrated circuit manufacturing system for generating an integrated circuit embodying a processor.

FIG. 8 shows an example of an integrated circuit (IC) manufacturing system 802 which is configured to manufacture a processor as described in any of the examples herein. In particular, the IC manufacturing system 802 comprises a layout processing system 804 and an integrated circuit generation system 806. The IC manufacturing system 802 is configured to receive an IC definition dataset (e.g. defining a processor as described in any of the examples herein), process the IC definition dataset, and generate an IC according to the IC definition dataset (e.g. which embodies a processor as described in any of the examples herein). The processing of the IC definition dataset configures the IC manufacturing system 802 to manufacture an integrated circuit embodying a processor as described in any of the examples herein.

The layout processing system 804 is configured to receive and process the IC definition dataset to determine a circuit layout. Methods of determining a circuit layout from an IC definition dataset are known in the art, and may involve synthesizing RTL code to determine a gate level representation of a circuit to be generated, e.g. in terms of logical components (NAND, NOR, AND, OR, MUX and FLIP-FLOP components). A circuit layout can be ascertained from the gate level representation of the circuit by determining positional information for the logical components. This may be done automatically or with user involvement in order to optimize the circuit layout. When the layout processing system 804 has determined the circuit layout, it may output a circuit layout definition to the IC generation system 806. A circuit layout definition may be, for example, a circuit layout description.

The IC generation system 806 generates an IC according to the circuit layout definition, as is known in the art. For example, the IC generation system 806 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 806 may be in the form of computer-readable code which the IC generation system 806 can use to form a suitable mask for use in generating an IC.

The different processes performed by the IC manufacturing system 802 may be implemented all in one location, e.g. by one party. Alternatively, the IC manufacturing system 802 may be a distributed system such that some of the processes may be performed at different locations, and may be performed by different parties. For example, some of the stages of: (i) synthesizing RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a processor without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 8 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 8, the IC generation system may further be configured by an integrated circuit definition dataset to, on manufacturing an integrated circuit, load firmware onto that integrated circuit in accordance with program code defined at the integrated circuit definition dataset or to otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Figure 9:
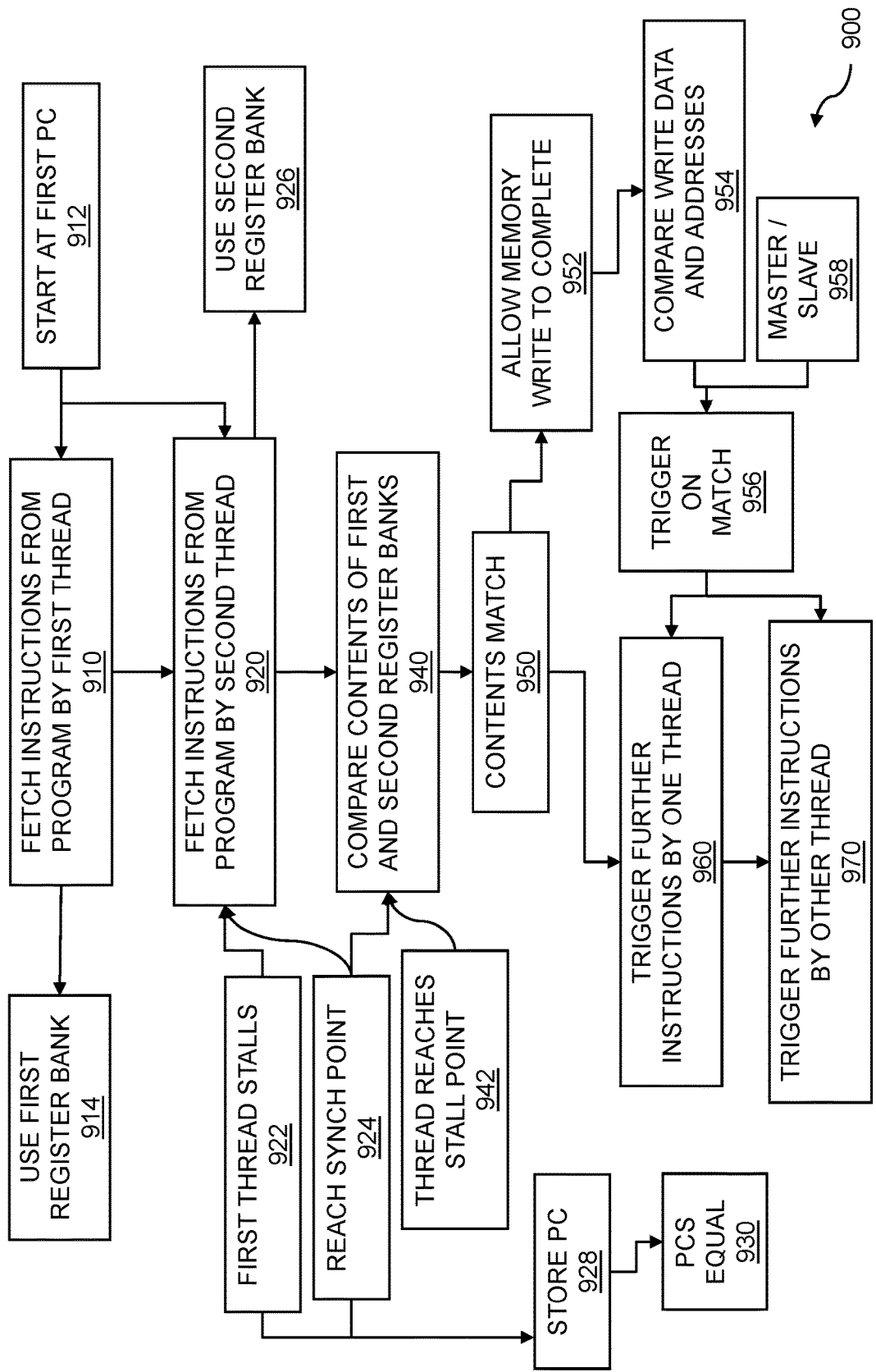
FIG. 9 is a flow diagram for operating a multi-threaded processor.

FIG. 9 is a flow diagram for operating a multi-threaded processor. Operating a multi-threaded processor can include fault detecting and fault tolerance. The flow 900 includes fetching a plurality of instructions 910 from a program by a first thread. The first thread can be a thread from a plurality of threads, where the first thread or the plurality of threads can be executed on the multi-threaded processor. The instructions of the program can be stored within the multi-threaded processor, stored within memory such as direct memory access (DMA) memory, a hybrid memory cube (HMC), or other memory coupled to the multi-threaded processor, and so on. The fetching the instructions can include starting at a first program counter 912. The first program counter can be associated with the program from which instructions are fetched by the first thread. The first program counter can be associated solely with the first thread or can be shared by a plurality of threads. The flow 900 can include the first thread using a first register bank 914. The first register bank can be one register bank of a plurality of register banks associated with the multi-threaded processor. The first register bank can be within the multi-threaded processor, can be coupled to the multi-threaded processor such as the DMA or HMC memories described throughout, or can be located beyond the multi-threaded processor. The first thread can execute the instructions that it has fetched from the program. In embodiments, the first thread can stall at a point in the program or can reach a predefined synchronization point in the program. The thread can stall due to waiting for data, waiting for processor resources, etc. The predefined synchronization point can introduce a "wait" process into the thread. The wait process can be used to synchronize execution of code across multiple threads of the multi-thread processor. In embodiments, the predefined synchronization point is a memory write. The predefined synchronization point can be used to write data, intermediate data, partial data, scratchpad data, etc. In other embodiments, the predefined synchronization point can a cache miss. In the event of a cache miss, various techniques can be used to obtain data or instructions. The cache miss can cause a thread to stall what data needed by the thread for processing is obtained from a local memory, storage, etc.

In response to the first thread stalling 922 at a point in the program or reaching a predefined synchronization point 924 in the program, the flow 900 includes fetching a plurality of instructions from the program by a second thread 920. As for the first thread, the fetching of a plurality of instructions from the program by the second thread can include starting at the first program counter 912. The second thread can be the second thread from among a plurality of threads to be executed by the multi-threaded processor. The flow 900 can include the second thread using a second register bank 926. The second register bank can be a second register bank of a plurality of register banks associated with the multi-threaded processor. In response to the first thread stalling at a point in the program or reaching a predefined synchronization point in the program, the flow 900 includes storing a current value of a program counter 928 of the first thread. The program counter of the first thread can point to an instruction in the program from which the first thread has fetched instructions, the instruction being decoded or executed by the first thread, and so on. Further actions may be taken based on program counters or states of other threads. In embodiments, the flow 900 includes determining when the second thread reaches the point in the program where the first thread stalled or reached the predefined synchronization point when a program counter of the second thread equals 930 the stored program counter value.

In response to the second thread reaching the point in the program where the first thread stalled 942 or reached the predefined synchronization point, the flow 900 includes comparing contents of the first and second register banks 940. In embodiments, a subset of the register banks is compared. The subset can include comparing each instruction's result after it is stored and before it is committed to the verified, architectural registers. Many architectural registers can exist, and therefore it may be more efficient to compare every result stored in one register after every cycle or instruction completion rather than waiting to gather many results and compare many registers at a less frequent interval. The compare every instruction can be accomplished via continuous checkpointing rather than periodic or sporadic synchronization. A processor can utilize a working register file (WRF) to hold results until the instructions are ready to graduate. Instructions can graduate when all prior instructions have graduated and there are no exceptions or mispredictions that arise in the checking. At that point, the instruction graduates, and the result from the WRF is written to an architectural register file (ARF). Because different functional units can have widely varying latencies, for example, one cycle for basic arithmetic logic unit operations to tens of cycles for complex multiply operations. Thus while instructions may be issued in order, the results may be available out of order. For fault detection, the master thread can write results to WRF if and only if the slave thread has completed the instruction and the results are identical. In this manner, every write to the ARF is validated and the entire contents of the ARF do not have to be checked at a subsequent synchronization event.

Returning to FIG. 9, the second thread can reach the stall point of the first thread by waiting for data, waiting for processor resources, and the like. The second thread can reach the point where the first thread stalled based on the contents of the program counter for the second thread. The predefined synchronization point may also be determined based on the contents of the program counter for the second thread. The comparing contents of the first and second register banks can be accomplished by comparing register bits, bytes, words, characters, symbols, etc. As discussed elsewhere, various actions can be taken based on whether the compared contents of the first and second register banks match or do not match. In response to determining that the contents match 950, the flow 900 includes allowing the memory write to complete 952 before triggering a further plurality of instructions from the program by one of the first and second threads. The completing of a memory write can ensure that memory contents such as data of one or more given memory locations have been successfully updated before another operation is performed on those one or more memory locations. While two or more read operations each may successfully access a memory location within a given period of time, two or more writes may or may not cause conflicts. The multiple read/multiple write, or memory contention problem, can be resolved using various techniques.

In embodiments, the flow 900 includes comparing write data and write addresses 954 of the memory writes of the first and second threads in addition to comparing contents of the first and second register banks. That is, if the contents of the register banks (e.g. data) being written to the same write addresses is the same, then the contention problem is obviated. The flow 900 includes only triggering further pluralities of instructions in response to determining that, in addition to the contents of the first and second register banks matching, the write data matches and the write addresses also match 956. In embodiments, the first thread can be a master thread and the second thread can be a slave thread 958. The master thread can direct the operations of the slave thread, provide data to the slave thread, await results from the slave thread, and so on. In response to determining that the contents match, triggering a further plurality of instructions from the program by the first thread followed by the same further plurality of instructions by the second thread. In response to determining that the contents match, the flow 900 includes triggering. The flow 900 includes triggering a further plurality of instructions from the program by one of the first and second threads 960 followed a further plurality of instructions by the other of the first and second threads 970. The triggering a further plurality of instructions from the program can include fetching instructions from storage within the multi-threaded processor, from DMA storage, from an HMC storage, from storage beyond the multi-threaded processor, and the like. The triggering a further plurality of instructions from the program can include executing a next set of instructions. The next set of instructions can be fetched in real time as needed, or they can be prefetched and stored in processor-local buffers, registers, caches, SRAMs, etc. Thus in embodiments, the triggering comprises beginning execution of the further plurality of instructions from the program. Various other techniques can be applied in the event that the contents of the first register bank do not match the contents of the second register bank. In embodiments, raising an exception in response to determining that the contents do not match.

Figure 10:
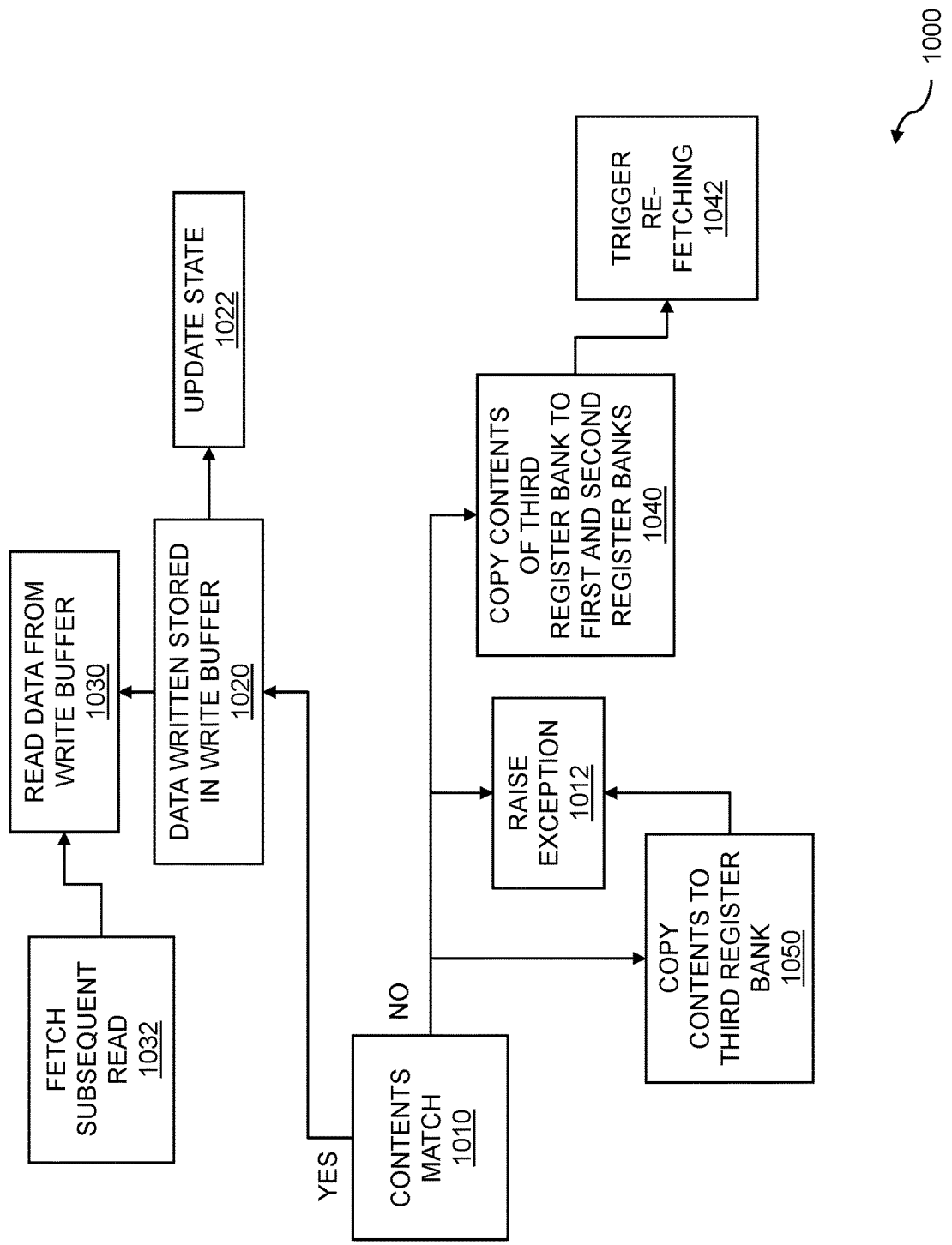
FIG. 10 is a flow diagram for content match handling.

FIG. 10 is a flow diagram for content match handling. Contents of register banks, addresses, memory contents, and so on, can be matched. The matching of contents can be used for fault detecting and fault tolerant multi-threaded processors. A plurality of instructions is fetched from a program by a first thread starting at a first program counter, the first thread using a first register bank. A plurality of instructions is fetched from the program by a second thread starting at the first program counter, the second thread using a second register bank. In response to the second thread reaching the point in the program where the first thread stalled or reached a predefined synchronization point, contents of the first and second register banks are compared. When the contents match, fetching is triggered of a further plurality of instructions from the program by one of the first and second threads followed a further plurality of instructions by the other of the first and second threads.

The flow 1000 includes determining that the contents match 1010. The contents that can match can include the contents of a first register bank and a second register bank; the write data and the write addresses of memory writes of the first thread and the second thread; and so on. In embodiments, the comparing write data and write addresses of the memory writes of the first and second threads can be performed in addition to comparing contents of the first and second register banks. The flow 1000 further includes, when executing a memory write by the first thread to a memory location, data being written and stored in a write buffer 1020. A memory write can include writing to the write buffer, to direct memory access (DMA) memory, to a hybrid memory cube (HMC), to memory external to the multi-threaded processor, and the like. In the flow 1000, a state 1022 associated with the entry in the write buffer is updated to indicate that it has been written by the first thread. In other embodiments, the state that can be associated with an entry in a write buffer can be updated to indicate that the state has been written by a second thread, a third thread, and so on. In response to fetching a subsequent read instruction 1032 of the memory location by the first thread, the flow 1000 includes reading the data 1030 from the entry in the write buffer instead of from the memory location or a cache. The reading the data from the entry in the write buffer can be accomplished faster than can reading the data from DMA memory, an HMC, from external memory, etc. The reading of the data can be accomplished by transferring the data, by passing a pointer to the data, etc. Thus, some embodiments include reading data from the entry in the write buffer instead of from a memory location or a cache in response to fetching a subsequent read instruction of the memory location by the first thread.

In embodiments, the contents of the first register bank and the second register bank, the write data and the write addresses, and so on, do not match. In response to determining that the contents do not match, the flow 1000 includes copying contents of the third register bank to the first and second register banks 1040. The copying contents of the third register bank to the first and second register banks can be accomplished by physically copying the data between or among register banks, by referencing the data by passing a pointer to the location of the data, or by other techniques. In embodiments, the flow 1000 includes triggering refetching 1042 of a plurality of instructions from the program by one thread or by the first and second threads starting at the first program counter. Other techniques can be applied in the event that the contents do not match. In embodiments, the flow 1000 includes raising an exception 1012 when the contents do not match. Further to determining that the contents do not match, the flow 1000 includes copying the contents to a third register bank 1050. In response to determining that the third register bank contents equal a threshold value, the flow 1000 includes raising an exception. The exception raised can be the same exception 1012 indicating that contents do not match, or it can be a different exception (not shown).

Figure 11:
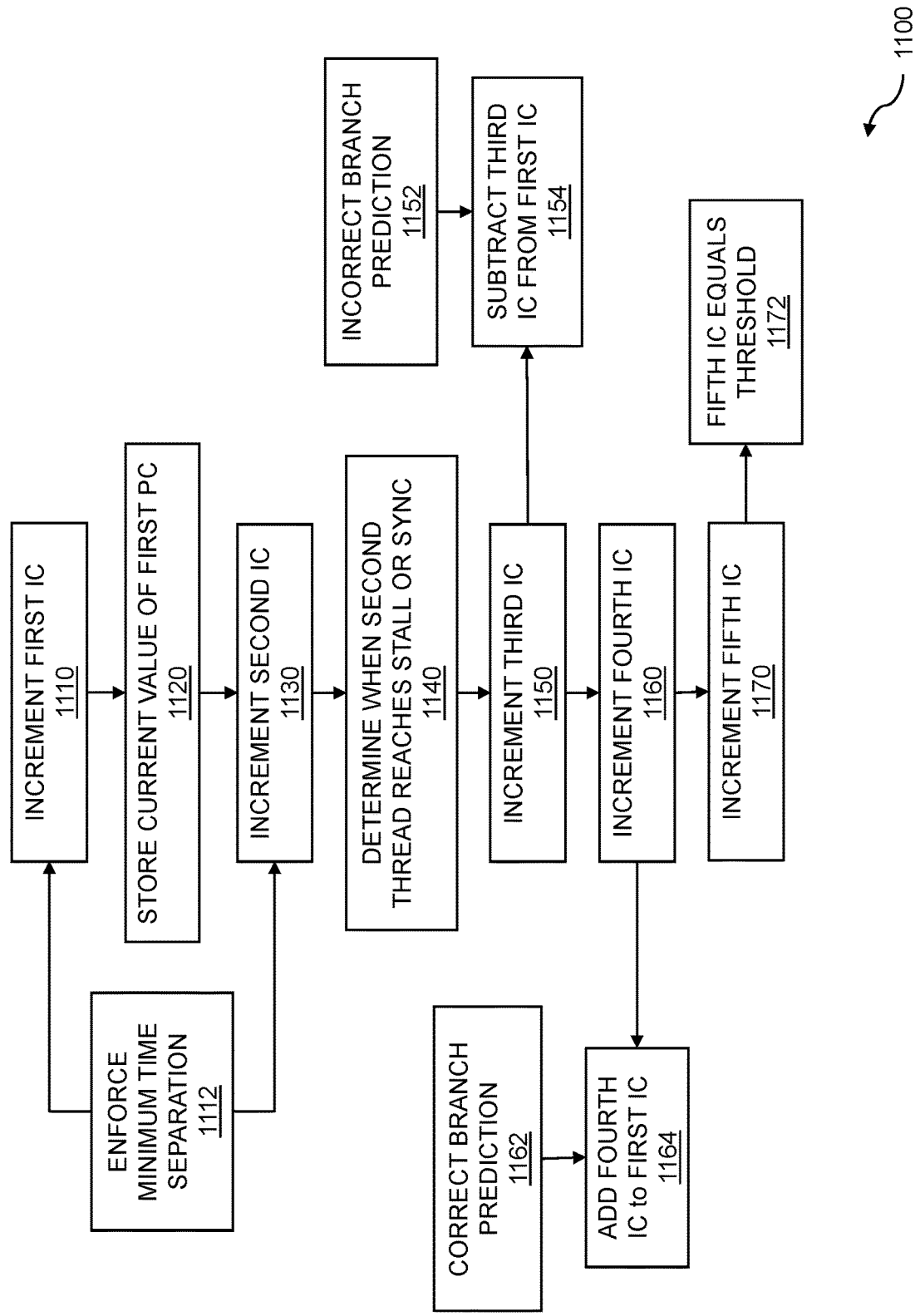
FIG. 11 is a flow diagram instruction register handling.

FIG. 11 is a flow diagram for instruction register handling. One or more instruction registers, which store one or more instructions being executed or decoded, can be used to support operation of multi-threaded processors. Operating a multi-threaded processor can include fault detection and fault tolerance within the multi-threaded processors. A plurality of instructions is fetched from a program by a first thread starting at a first program counter, the first thread using a first register bank. A plurality of instructions is fetched from the program by a second thread starting at the first program counter, the second thread using a second register bank. Contents of the first and second register banks are compared. In response to determining that the contents match, fetching is triggered of a further plurality of instructions from the program by one of the first and second threads followed a further plurality of instructions by the other of the first and second threads.

The flow 1100 includes incrementing a first instruction counter (IC) 1110 for each instruction executed by the first thread after the first program counter. In the context of this document, the program counter can indicate which instructions from a program can be fetched by a thread. The instruction counter can indicate which instructions that were fetched are being executed by a thread. The first IC can be incremented as instructions fetched from a plurality of instructions from a program are executed by the first thread. The first thread can be incremented, decremented, loaded with a value such as a value resulting from a compare operation, a conditional branch, and so on. The flow 1100 includes storing a current value of a program counter 1120 of the first thread. The current value of a program counter, an instruction counter, a register, and so on, can occur in response to the first thread stalling at a point in the program or reaching a predefined synchronization point in the program. The flow 1100 includes incrementing a second instruction counter 1130 for each instruction executed by the second thread after the first thread has stalled or reached the predefined synchronization point. The instruction executed by the second thread can be executed after the first thread has stalled or reached a predefined synchronization point to avoid race conditions, processor resource contention, and the like. In embodiments, the flow 1100 includes enforcing a minimum time separation 1112 of S clock cycles between the first and second thread executing the same instruction from the same program. In some embodiments, S is determined by the length of time it takes for a master thread instruction to complete, wherein the master thread instruction completing unblocks execution of the same instruction in the slave thread.

The flow 1100 includes determining when the second thread reaches the point in the program where the first thread stalled or reached the predefined synchronization point 1140 when both a program counter of the second thread equals the first program counter and the second instruction counter equals the first instruction counter. The first thread can stall due to a lack of data, unavailability of processor resources, and so on. The predefined synchronization point can be included to support a wait operation, where a wait operation can be based on a wait property such as a variable value, a threshold, a condition, etc. The flow 1100 includes incrementing a third instruction counter 1150 for each speculative instruction executed by an executing thread. A speculative instruction execution can include executing an instruction based on a prediction such as a branch prediction. Speculative instruction execution can be performed to support parallel instruction execution, to increase parallelism, to reduce execution time, and so on. When speculative instruction execution is performed as part of branch prediction, the branch prediction may or may not be correct. In embodiments, speculative instruction execution can be performed based on two or more possible branch predictions. In response to an incorrect branch prediction 1152, a value of the third instruction counter can be subtracted from the first instruction counter 1154 if the first thread is the executing thread, and from the second instruction counter if the second thread is the executing thread. Threads within a multi-threaded processor can be a master thread or a slave thread. In embodiments, the first thread is a master thread and the second thread is a slave thread.

In embodiments, the first and second instruction counters are not incremented upon execution of a speculative instruction. The instruction counters may not be incremented due to a thread stalling, a threading reaching a predefined synchronization point, etc. The flow 1100 includes incrementing a fourth instruction counter 1160 for each speculative instruction executed by an executing thread. The fourth instruction counter can account for which speculative instruction is being decoded or executed. In response to correct branch prediction 1162, a value of the fourth instruction counter can be added to the first instruction counter 1164 if the first thread is the executing thread and to the second instruction counter if the second thread is the executing thread. Some embodiments include adding a value of the fourth instruction counter to the first instruction counter if the first thread is the executing thread or to the second instruction counter if the second thread is the executing thread, based on correct branch prediction.

The flow 1100 further includes incrementing a fifth instruction counter 1170 for each instruction fetched by the second thread. The fifth instruction counter can be used for instructions to be executed by the second thread, for predictive execution of instructions within the second thread, and so on. The fifth instruction counter can be compared to a threshold, where the threshold can be a maximum number of instructions executed predictively, a minimum number of instructions executed predictively, and the like. In response to determining that the fifth instruction counter equals a threshold value 1172, the flow 1100 can include copying contents of the third register bank to the first and second register banks, triggering refetching of a plurality of instructions from the program by one or the first and second threads starting at the first program counter, and resetting the fifth instruction counter. Incrementing of the fifth instruction counter can resume based on each instruction fetched by the second thread.

Figure 12:
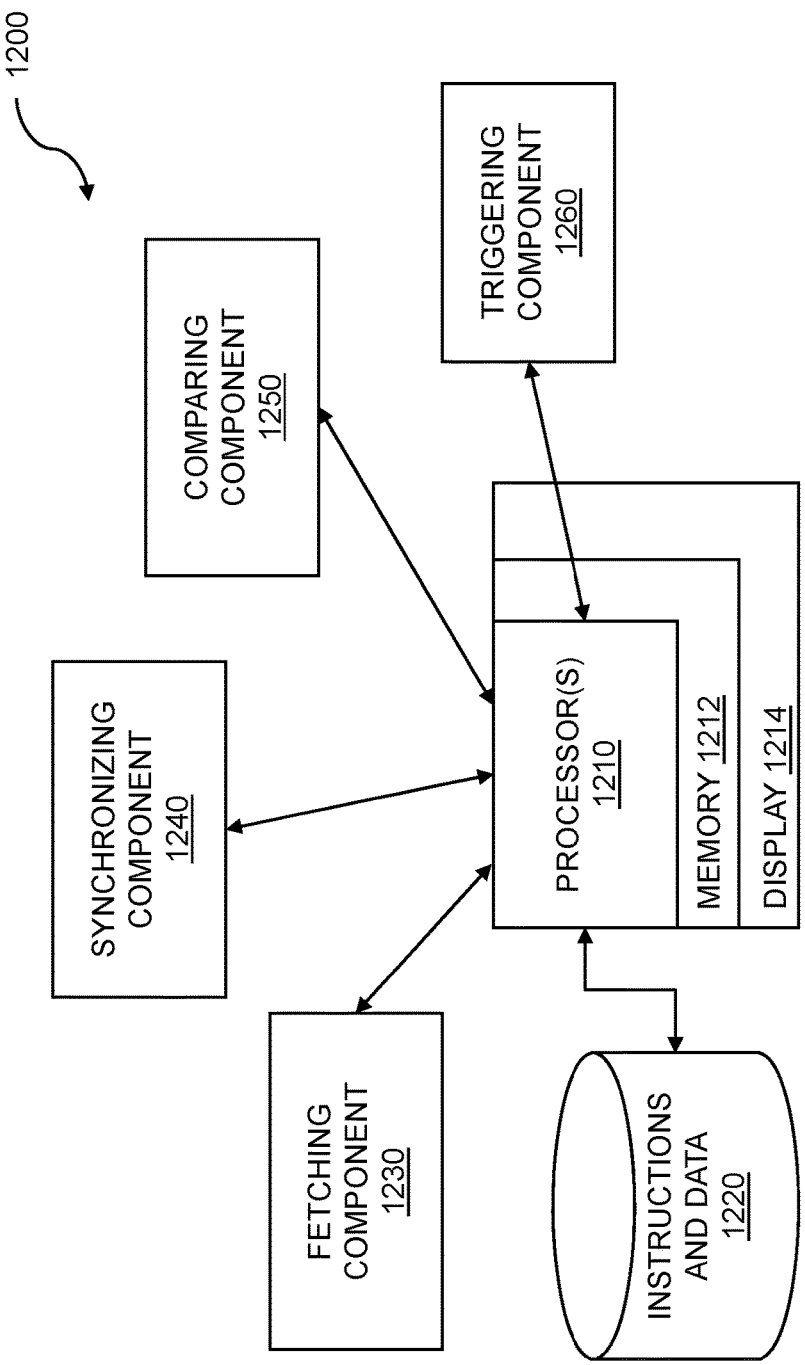
FIG. 12 is a system diagram for operating a multi-threaded processor

FIG. 12 is a system diagram for operating a multi-threaded processor. The system 1200 can include one or more processors 1210 coupled to a memory 1212 which stores instructions. The system 1200 can include a display 1214 coupled to the one or more processors 1210 for displaying data, intermediate steps, instructions, program counters, instruction counters, and so on. In embodiments, one or more processors 1210 are attached to the memory 1212 where the one or more processors, when executing the instructions which are stored, are configured to: fetch a plurality of instructions from a program by a first thread starting at a first program counter, the first thread using a first register bank; fetch a plurality of instructions from the program by a second thread starting at the first program counter, the second thread using a second register bank in response to the first thread stalling at a point in the program or reaching a predefined synchronization point in the program; compare contents of the first and second register banks in response to the second thread reaching the point in the program where the first thread stalled or reached the predefined synchronization point; and trigger fetching of a further plurality of instructions from the program by one of the first and second threads followed by a further plurality of instructions by the other of the first and second threads in response to determining that the contents match.

The system 1200 can include a collection of instructions and data 1220. The instructions and data 1220 may be stored in a database, one or more statically linked libraries, one or more dynamically linked libraries, precompiled headers, source code, flow graphs, or other suitable formats. The instructions can include instructions for fault detecting and fault tolerant multi-threaded processors, where the processors can include processing elements in a reconfigurable fabric. The system 1200 can include a fetching component 1230. The fetching component can include functions and instructions for fetching a plurality of instructions from a program by a first thread starting at a first program counter, the first thread using a first register bank. The instructions can be stored within the multi-threaded processors, stored beyond the multi-threaded processors in a direct memory access (DMA) memory, stored in a hybrid memory cube (HMC), stored within a distributed memory, and so on. The system 1200 can include a synchronizing component 1240. The synchronizing component 1240 can include functions and instructions for synchronizing threads of the multi-threaded in response to a thread stalling or a thread reaching a predefined synchronization point in a program. In embodiments, in response to the first thread stalling at a point in the program or reaching a predefined synchronization point in the program, the fetching component can fetch a plurality of instructions from the program by a second thread starting at the first program counter, the second thread using a second register bank. The predefined synchronization point can include a memory write. The memory write can be controlled based on whether register banks, such as the first register bank and the second register bank, match. In embodiments, in response to determining that the contents match, the memory write can be allowed to complete before triggering a further plurality of instructions from the program by one of the first and second threads.

The system 1200 can include a comparing component 1250. The comparing component 1250 can compare contents of register banks, program counters, instruction counters, memory contents, and so on. In embodiments, in response to the second thread reaching the point in the program where the first thread stalled or reached the predefined synchronization point, the comparing component can compare contents of the first and second register banks. The system 1200 can include a triggering component 1260. The triggering component can include functions and instructions for triggering fetching of further instructions. The triggering component can include functions and instructions for triggering execution of further instructions. The triggering fetching and triggering execution can be combined in some embodiments in either a sequential or parallel fashion. In embodiments, in response to determining that the contents match, the triggering component can trigger fetching of a further plurality of instructions from the program by one of the first and second threads followed a further plurality of instructions by the other of the first and second threads.

The system 1200 can include a computer program product embodied in a non-transitory computer readable medium for instruction linkage, the computer program product comprising code which causes one or more processors to perform operations of: fetching a plurality of instructions from a program by a first thread starting at a first program counter, the first thread using a first register bank; fetching a plurality of instructions from the program by a second thread starting at the first program counter, the second thread using a second register bank in response to the first thread stalling at a point in the program or reaching a predefined synchronization point in the program; comparing contents of the first and second register banks in response to the second thread reaching the point in the program where the first thread stalled or reached the predefined synchronization point; and triggering a further plurality of instructions from the program by one of the first and second threads followed by a further plurality of instructions by the other of the first and second threads in response to determining that the contents match.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. Various operations and analyses can be performed using Tensorflow™, Keras™, MXNet™, Caffe™, GEMM™, Sigmoid™, Softmax™, CNTK™, and the like. Deep learning, convolutional neural nets (CNN), recurrent neural nets (RNN), and the like can be implemented using technology described in this paper. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A method of operating a multi-threaded processor comprising:
   fetching a plurality of instructions from a program by a first thread starting at a first program counter, the first thread using a first register bank;
   fetching a plurality of instructions from the program by a second thread starting at the first program counter, the second thread using a second register bank in response to the first thread stalling at a point in the program or reaching a predefined synchronization point in the program, wherein the predefined synchronization point is a memory write;
   comparing contents of the first and second register banks in response to the second thread reaching the point in the program where the first thread stalled or reached the predefined synchronization point; and
   triggering a further plurality of instructions from the program by one of the first and second threads followed by a further plurality of instructions by the other of the first and second threads in response to determining that the contents match.

2. The method of claim 1 wherein the triggering comprises beginning execution of the further plurality of instructions from the program.

3. The method of claim 1 wherein the triggering comprises fetching the further plurality of instructions from the program.

4. The method of claim 1 wherein the comparing of the contents of the first and second register banks comprises comparing a subset of the contents.

5. The method of claim 1 further comprising allowing the memory write to complete before triggering a further plurality of instructions from the program by one of the first and second threads followed by a further plurality of instructions by the other of the first and second threads in response to determining that the contents match.

6. The method of claim 1 further comprising comparing write data and write addresses of memory writes of the first and second threads.

7. The method of claim 6 wherein the triggering a further plurality of instructions from the program by one of the first and second threads followed by a further plurality of instructions by the other of the first and second threads in response to determining that the contents match only occurs when the comparing write data and write addresses of memory writes of the first and second threads produces a match.

8. The method of claim 1 wherein the predefined synchronization point is a cache miss.

9. The method of claim 8 further comprising storing data to be written as a result of an output of the first thread as an entry in a write buffer and updating a state associated with the entry in the write buffer to indicate that it has been written by the first thread.

10. The method of claim 9 further comprising reading data from the entry in the write buffer instead of from a memory location or a cache in response to fetching a subsequent read instruction of the memory location by the first thread.

11. The method of claim 1 further comprising storing a current value of a program counter of the first thread in response to the first thread stalling at a point in the program or reaching a predefined synchronization point in the program.

12. The method of claim 11 further comprising determining when the second thread reaches the point in the program where the first thread stalled or reached the predefined synchronization point based on when a program counter of the second thread equals the current value of the program counter that was stored.

13. The method of claim 1 further comprising incrementing a first instruction counter for each instruction executed by the first thread after the first program counter.

14. The method of claim 13 further comprising storing a current value of a program counter of the first thread in response to the first thread stalling at a point in the program or reaching a predefined synchronization point in the program.

15. The method of claim 14 further comprising incrementing a second instruction counter for each instruction executed by the second thread after the first thread has stalled or reached the predefined synchronization point.

16. The method of claim 15 further comprising determining when the second thread reaches the point in the program where the first thread stalled or reached the predefined synchronization point based on a program counter of the second thread equaling the first program counter and the second instruction counter equaling the first instruction counter.

17. The method of claim 15 wherein the first and second instruction counters are not incremented upon execution of a speculative instruction.

18. The method of claim 17 further comprising incrementing a fourth instruction counter for each speculative instruction executed by an executing thread.

19. The method of claim 18 further comprising adding a value of the fourth instruction counter to the first instruction counter if the first thread is the executing thread or to the second instruction counter if the second thread is the executing thread, based on correct branch prediction.

20. The method of claim 19 further comprising adding a fifth instruction counter, wherein the fifth instruction counter is incremented for each instruction fetched by the second thread.

21. The method of claim 20 wherein an exception is raised based on the fifth instruction counter equaling a threshold value.

22. The method of claim 21 further comprising incrementing the fifth instruction counter for each instruction fetched by the second thread, copying contents of a third register bank to the first and second register banks, triggering refetching of a plurality of instructions from the program by one or the first and second threads starting at the first program counter, and resetting the fifth instruction counter, based on determining that the fifth instruction counter equals a threshold value.

23. The method of claim 1 further comprising enforcing a minimum time separation of S clock cycles between the first and second thread executing a same instruction from the same program, wherein S is a predefined, positive integer.

24. A multi-threaded processing apparatus comprising:
a first register bank associated with a first thread;
a second register bank associated with a second thread; and
a multi-stage execution pipeline comprising:
a scheduler implemented in hardware logic and arranged to cause a plurality of instructions from a program to be fetched by the first thread starting at a first program counter value and to cause a plurality of instructions from the same program to be fetched by the second thread starting at the first program counter in response to the first thread stalling or reaching a predefined synchronization point in the program, wherein the predefined synchronization point is a memory write; and
comparison logic arranged to compare contents of the first and second register banks in response to determining that the second thread has caught up with the first thread, wherein in response to determining that the contents match, to trigger fetching of a next plurality of instructions from the program by one of the first and second threads followed by the other of the first and second threads.

25. A computer program product embodied in a non-transitory computer readable medium for multi-threaded processor operation, the computer program product comprising code which causes one or more processors to perform operations of:
fetching a plurality of instructions from a program by a first thread starting at a first program counter, the first thread using a first register bank;
fetching a plurality of instructions from the program by a second thread starting at the first program counter, the second thread using a second register bank in response to the first thread stalling at a point in the program or reaching a predefined synchronization point in the program, wherein the predefined synchronization point is a memory write;
comparing contents of the first and second register banks in response to the second thread reaching the point in the program where the first thread stalled or reached the predefined synchronization point; and
triggering a further plurality of instructions from the program by one of the first and second threads followed by a further plurality of instructions by the other of the first and second threads in response to determining that the contents match.

* * * * *